United States Patent [19]

Schuring et al.

[11] Patent Number: 5,032,042
[45] Date of Patent: Jul. 16, 1991

[54] METHOD AND APPARATUS FOR ELIMINATING NON-NATURALLY OCCURRING SUBSURFACE, LIQUID TOXIC CONTAMINANTS FROM SOIL

[75] Inventors: John R. Schuring, Blairstown, N.J.; Paul C. Chan, Staten Island, N.Y.; John W. Liskowitz, Belle Mead, N.J.; Panayiotis Papanicolaou, Brooklyn, N.Y.; Craig T. Bruening, Somerset, N.J.

[73] Assignee: New Jersey Institute of Technology, Newark, N.J.

[21] Appl. No.: 543,956

[22] Filed: Jun. 26, 1990

[51] Int. Cl.⁵ ................................................ E02D 3/00
[52] U.S. Cl. ..................................... 405/258; 166/191; 166/308; 405/128; 405/269
[58] Field of Search ............... 405/128, 129, 131, 258, 405/263, 269; 166/148, 191, 308; 210/747

[56] References Cited

U.S. PATENT DOCUMENTS

| | | | |
|---|---|---|---|
| 3,255,820 | 6/1966 | Brandon | 166/308 X |
| 4,545,702 | 10/1985 | Sano et al. | 405/269 |
| 4,651,824 | 3/1987 | Gradle | 405/129 X |
| 4,765,902 | 8/1988 | Ely et al. | 405/129 X |
| 4,842,448 | 6/1989 | Koerner et al. | 405/258 |
| 4,945,988 | 8/1990 | Payne et al. | 405/258 X |
| 4,957,393 | 9/1990 | Buelt et al. | 405/128 |

Primary Examiner—David H. Corbin
Attorney, Agent, or Firm—Klauber & Jackson

[57] ABSTRACT

Apparatus for eliminating non-naturally occurring, subsurface, liquid toxic contaminants from soil, includes a fracturing assembly for pneumatically fracturing the soil, the fracturing assembly including a tubular probe which receives a pressurized gas, the probe including a soil penetrating portion adapted to be inserted in a well in the soil and an above soil portion in fluid communication with the soil penetrating portion, the soil penetrating portion including a tube which receives the pressurized gas, first and second packers connected with the tube for pressing against walls of the well so as to provide a sealed area in the well between the first and second packers, a nozzle position in the sealed area in fluid communication with the tube for supplying the pressurized gas into the soil, the nozzle including at least one orifice therein which fluidly connects the soil with the tubular probe and an adjustment assembly which permits relative movement between the first and second packers in response to soil movement during a soil fracturing operation; and a pressurized gas supply which supplies the pressurized gas to the above soil portion of the tubular probe such that the pressurized gas travels through the at least one orifice into the soil to produce a fractured soil formation; and a transformation assembly which transforms liquid toxic contaminants in the soil into a different state, such as a vapor state or non-toxic state to decontaminant the soil, after creation of the fractured soil formation.

34 Claims, 7 Drawing Sheets

METHOD AND APPARATUS FOR ELIMINATING NON-NATURALLY OCCURRING SUBSURFACE, LIQUID TOXIC CONTAMINANTS FROM SOIL

BACKGROUND OF THE INVENTION

Contamination of soil and ground water is presently one of the major environmental concerns in the United States and other industrial countries. Subsurface contamination has reached a level and extent at which it poses a serious threat to human health and the environment.

In recent years, a number of State and Federal Regulations have been developed to control and reduce subsurface contamination. Unfortunately, the technology available to clean-up the contamination sites is often not effective, and those that are effective, may be prohibitively expensive.

The ground water environment is generally divided into two major zones, (1) the unsaturated zone, also known as the "vadose zone" and (2) the saturated zone. The vadose zone extends from the ground surface down to the ground water table, while the saturated zone begins at the ground water table and extends to a further depth. The vadose zone may be further divided into additional subzones, but for purposes of the present invention, it will be considered as a single zone.

Since the vadose zone is the uppermost layer of the terrestrial environment, it contains the most important pathways for the toxic and hazardous chemicals to enter groundwater systems. As such, the removal of the toxic and hazardous chemicals in this zone is of paramount importance for all groundwater remediation.

The principal mechanisms that control the flow and transport of chemicals in the vadose soil zone are mass flow, liquid diffusion, and vapor diffusion. Further, treatment of the vadose zone is high priority in any ground water remediation action since transport of the contaminants from the unsaturated to the saturated zones occurs continuously by percolation and vapor transport. Studies have shown that it is less costly to remove volatile organic compounds (VOC) from the vadose zone than to pump and treat contaminated ground water. For this reason, technology is being developed for the in situ removal of VOC from the vadose zone. Such treatment technologies include vapor extraction, biodegradation, soil washing and thermal treatment.

Several factors influence volatilization from soil. Temperature is one of the major factors that must be taken into account. Volatilization increases significantly as temperature increases because of the increase in vapor density and thereby the increase of vapor diffusion. Chemical concentration increases will increase volatilization considering that the chemical's vapor density is not saturated. Decreasing water content increases the vapor diffusion and volatilization. Finally, the wind speed increases volatilization because it improves mixing with the atmosphere and can increase volatilization.

Specifically, vapor extraction is a process for the in situ removal of volatile organic compounds (VOC) by mechanically extracting soil gas from the vadose zone. Specifically, one or more vertically oriented perforated vent wells are installed in the contaminated zone in the ground, and air is forced to travel through the pore space in the soil, causing volatilization of the liquid and adsorbed volatile organic compounds. The extracted soil gas is then either vented to the atmosphere or into an emission control system, depending on the concentration.

Two major variations of the vapor extraction process have been demonstrated successfully, namely an in situ air stripping process and a vacuum extraction process.

In the in situ air stripping process, a series of interconnected air injector vents are supplied with forced air by an above ground blower and manifold system that forces the air into the soil through the perforated vent wells. A separate blower and manifold system is used to apply negative pressure to air extraction vents to withdraw the soil gas. The injection and extraction vents are located alternately within the array of vent wells on the site. To achieve a degree of flow containment, extraction vents are placed on the perimeter of the area being treated.

Although various tests have found the air stripping process to be effective in removal of VOC from the vadose zone, these tests have identified an important limitation to its use. Specifically, the system functions best with high permeable soil such as the loose, sandy soils present. It was therefore concluded by the testers that the process would be much less effective in tightly packed soils and in soils with a high clay content.

The second variation of the vapor extraction process is vacuum extraction. As with in situ air stripping, vacuum extraction provides at least one perforated vent well installed in the vadose soil zone. A vacuum pump is installed on the wells and induces a negative pressure gradient around the well to remove the VOC along with the soil gas. Various examples of usage thereof include leakage of carbon tetrachloride from an industrial tank farm into a clay-like residual soil in a karst area in Puerto Rico, and surface spillage of acetone and methylene chloride around underground storage tanks, in which a vacuum extraction system was used to reduce the contamination to an acceptable limit. Even though the soil at the sites consisted of mixed silts, sands and clays, the vacuum wells developed a radius of influence of up to 17 feet. High recovery rates have also been reported using vacuum extraction to withdraw gasoline and residual hydrocarbons from gravel backfill around leaking underground storage tanks.

A summary of the design considerations of vacuum extraction systems is provided in the article "Vacuum Extraction From Soil" by M. B. Bennedsen, *Pollution Engineering*, Feb. 1987, pages 66-68. In the article, it is concluded that vacuum extraction has been used successfully on soils in a range of permeability from $1 \times 10^{-4}$ to $1 \times 10^{-8}$ cm/sec. Other important design parameters include the depth to the water table, the air emission control and short circuiting of air from the ground surface. In order to control the latter, a cover is sometimes installed over the area.

As discussed above, biodegradation is another process which has effectively been used in the treatment of soils contaminated with hazardous organic compounds. Specifically, with biodegradation or bioremediation, the environmental conditions in the soil are altered to enhance microbial catabolism or to cometabolise the organic contaminant, thus transforming it into a simpler, non-toxic product. In most applications, indigenous microorganisms are utilized, although seeding of the soil with indigenous microorganisms has also been used where natural occurring organisms are unable to degrade the contaminants.

Microorganisms can be classified into three main categories, namely (1) aerobic, which grow only in the presence of oxygen, (2) anaerobic, which grow only in the absence of oxygen, and (3) facultative anaerobic, which can grow either in the absence or presence of oxygen. The biodegradation method which has been found most effective in treatment of the vadose soil zone has been the aerobic microbial process. With this process, oxygen and often nutrients are injected or infiltrated into the subsurface environment, using wells or a percolation process. For example, wells are drilled into the soil and nutrients for feeding the microbes are dropped down into the well, or microbes are seeded in the well. Thereafter, the microbes are blown outwardly by forced air or the like. A concise summary of the major factors which affect the rate of biodegradation in the vadose zone are described by R. L. Valentine et al in "Biotransformation" in *Vadose Zone Modellino of Organic Pollutants,* edited by Stephen Hern et al, Lewis Publishers, Inc. Mich., Chapter 9 (1986), and include: (1) pH, (2) temperature, (3) water content, (4) carbon content, (5) clay content, (6) oxygen, (7) nutrients, (8) the nature of the microbial population, (9) acclamation and (10) concentration.

A number of investigators have reported successful application of the in situ biodegradation process to treatment contaminated soils and have concluded that it is often cost effective and reduces site disruption. Some important limitations have also been identified, such as reaction kinetics, low substrate concentration and slow degradability of certain compounds.

R. Wetzel et al in "Demonstration of In Situ Biological Degradation of Contaminated Ground Water and Soils", Sixth National Conference on Management of Uncontrolled Hazardous Waste Sites, Washington, D.C. (1985) describe a demonstration at Kelly Air Force Base, Texas, to treat contaminants consisting of hydrocarbons, aromatics and halogenated organics. A major limiting factor of the remediation is cited as the low permeability of the fine-grained soil layers present at the site.

Further, V. Jhaveri et al describe in "Bioreclammation of Ground and Ground Water by In Situ Biodegradation" Case History, Sixth National Conference on Management of Uncontrolled Hazardous Waste Sites, Washington, D.C. (1985) report the bioreclammation of a site in New Jersey contaminated with methylene chloride, n-butyl alcohol, acetone and dimethylaniline. After three years of in situ aerobic biological treatment, the contaminant plume was reduced by 90%.

Still further, P. Yaniga et al in "Aquifer Restoration Via Accelerated In Situ Biodegradation of Organic Contaminants", Seventh National Conference on Management of Uncontrolled Hazardous Waste Sites, Washington, D.C. (1986), in describing the reclamation of an aquifer contaminated with benzene, toluene, and xylene using biodegradation, emphasize the importance of oxygenating the subsurface environment. It is reported therein that superior rates of biodegradation using hydrogen peroxide as an oxygen donor result in comparison with a more traditional technique of air sparging.

In the method of thermal treatment or thermal soil decontamination, a contaminated soil is heated to a temperature of 400° C. to 700° C., which is sufficient to evaporate or to pyrolize the organic contaminants. The gaseous products are then removed by convection. After dust removal from the gas stream, the organic products are completely destroyed in an after burner at temperatures as high as 1200° C. Consequently, the residual soil is ready for reuse after reconditioning, such as remoisturing. However, this method is in general unsuited for the removal of inorganic contaminants because of low volatility. Further, some inorganic compounds such as complexed cyanides and the more volatile metals such as mercury will decompose to gaseous products or evaporate partially under these conditions.

Thermal soil decontamination methods may be divided into two categories, namely rotary kiln fired decontamination and in situ decontamination. In the rotary kiln method, the required heat is transferred by direct or indirect firing of the soil. The fluidized bed technique is generally employed in direct heating, whereas infrared radiation on a conveyor belt or using hot oil in an extruder type reactor has been used for indirect heating. The in situ method applies radio frequency techniques. A system of electrodes is implanted into the ground to heat the soil to a predetermined temperature to vaporize the contaminants which are then vented by convection.

Another thermal treatment system is the thermal desorption-UV photolysis process described by S. G. DeCicco in "Transportable Hybrid Thermal Treatment System", 24th AIChE/ASME National Heat Transfer Conference, Pittsburgh, Pa., pages 407–412 (1987).

Although the approach seems to be promising in soil decontamination, the difficulty lies in the basic understanding of transport phenomena and chemical processes associated with evaporization/pyrolysis of organic matter such as organochlorine compounds. However, more research is needed to model the thermal desorption of contaminants from soils under a wide variety of thermal conditions.

In general, the in situ approach is less expensive than the rotary kiln method, but the latter has proved more effective since the kiln agitation reduces the amount of contaminant trapped in the soil pores.

Paramount among the limitations of the above existing and emerging treatment technologies in the vadose zone is the permeability of the soil formation being treated. The efficiency of the aforementioned in situ treatment processes all decrease as the soil permeability decreases. For soils with low permeabilities the existing processes are largely ineffective. Low soil permeability may be caused by a number of factors, including high clay content, high soil density and high fluid viscosity. Therefore, the effectiveness of virtually all in situ treatment processes in the vadose zone can be enhanced by increasing the permeability of the soil formation.

Unrelated to the removal of hazardous and industrial waste, it is also known to provide hydraulic fracturing in the petroleum industry to enhance well production. See, for example, the book *Hydraulic Fracturing* by G. C. Howard et al, Millet the Printer, Dallas, Tex., 1970. This is also related to pressure grouting procedures used to increase soil strength and decrease permeability around various engineering works, such as dam foundations and tunnels, which also uses water or other liquid agents.

In hydraulic fracturing, a section of an oil well is sealed off with pressure packers, and water is then injected until the pressure is sufficient to initiate fracture of the surrounding rocks. Once a crack is formed in the rocks, it will continue to propagate as long as the water pressure is greater than the stress normal to the plane of fracture. However, this process has only been used for fracturing rocks.

The theory describing hydraulic fracturing was first set out by M. King Hubbert in "Mechanics of Hydraulic Fracturing" in Trans. Am. Inst. Min. Engrs., Volume 210, pages 153-168 (1957) in which various modes of failure are discussed. Advances have also been made by subsequent investigators, such as R. O. Kehle in "The Determination Of Tectonic Stresses Through Analysis of Hydraulic Well Fracturing", J. Geophys. Res., Volume 69, pages 259-273 (1964) and P. L. Bertrand in "Note Seur L'Equilibre Elastigue D'Un Milieu Indefini Perce D'Une Cavite Cylindrique Sous Pression", Annls. Ponts. Chauss., Volume 134, pages 473-522 (1964), who employ a stress concentration concept to analyze fracture conditions.

OBJECTS AND SUMMARY OF THE INVENTION

Accordingly, it is an object of the present invention to provide a method and apparatus for eliminating non-naturally occurring, subsurface, liquid toxic contaminants that overcomes the aforementioned problems with the prior art.

It is another object of the present invention to provide a method and apparatus for eliminating non-naturally occurring, subsurface, liquid toxic contaminants more rapidly.

It is still another object of the present invention to provide a method and apparatus for eliminating non-naturally occurring, subsurface, liquid toxic contaminants that introduces flow channels into the soil.

It is yet another object of the present invention to provide a method and apparatus for eliminating non-naturally occurring, subsurface, liquid toxic contaminants that provides aeration of the soil.

It is a further object of the present invention to provide a method and apparatus for eliminating non-naturally occurring, subsurface, liquid toxic contaminants with a reduction of soil bulk density.

It is a still further object of the present invention to provide a method and apparatus for eliminating non-naturally occurring, subsurface, liquid toxic contaminants that results in the breaking of surface tension between the soil and contaminants.

It is a yet further object of the present invention to provide a method and apparatus for eliminating non-naturally occurring, subsurface, liquid toxic contaminants that can provide modification of soil temperature.

It is another object of the present invention to provide a method and apparatus for eliminating non-naturally occurring, subsurface, liquid toxic contaminants by providing enhancement of emerging clean-up technologies.

It is still another object of the present invention to provide a method and apparatus for eliminating non-naturally occurring, subsurface, liquid toxic contaminants which can enhance microbial activity.

It is yet another object of the present invention to provide a method and apparatus for eliminating non-naturally occurring, subsurface, liquid toxic contaminants in which the oxygen concentration in the soil can be increased to encourage more rapid aerobic and anaerobic digestion.

It is a further object of the present invention to provide a method and apparatus for eliminating non-naturally occurring, subsurface, liquid toxic contaminants in which the water content of the soil can be reduced to enhance biodegradation.

It is a still further object of the present invention to provide a method and apparatus for eliminating non-naturally occurring, subsurface, liquid toxic contaminants that is less dependent on the type of soil utilized.

It is a yet further object of the present invention to provide a method and apparatus for eliminating non-naturally occurring, subsurface, liquid toxic contaminants which can provide nutrient seeding.

It is a still further object of the present invention to provide a method and apparatus for eliminating non-naturally occurring, subsurface, liquid toxic contaminants that is relatively easy and economical to manufacture and use.

In accordance wit an aspect of the present invention, apparatus for eliminating non-naturally occurring, subsurface, liquid toxic contaminants from soil, includes a) fracturing means for pneumatically fracturing the soil, the fracturing means including i) tubular probe means for receiving a pressurized gas, the probe means including a soil penetrating portion adapted to be inserted in the soil and an above soil portion in fluid communication with the soil penetrating portion; ii) nozzle means in fluid communication with the soil penetrating portion of the tubular probe means for supplying the pressurized gas from the tubular probe means into the soil, the nozzle means including at least one orifice therein which fluidly connects the soil with the tubular probe means; and iii) pressurized gas supply means for supplying a pressurized gas to the above soil portion of the tubular probe means, wherein the pressurized gas travels through the at least one orifice into the soil to produce a fractured soil formation; and b) means for transforming the liquid toxic contaminants into a different state to decontaminate the soil, after creation of the fractured soil formation.

In accordance with another aspect of the present invention, a method for eliminating non-naturally occurring, subsurface, liquid toxic contaminants from soil, includes the steps of a) pneumatically fracturing the soil, including the steps of i) inserting a tubular probe partially into the soil such that at least one orifice of a nozzle fluidly connected with the tubular probe is positioned at a predetermined height; and ii) supplying a pressurized gas into the tubular probe such that the pressurized gas travels through the at least one orifice into the soil to produce a fractured soil formation; and b) transforming the liquid toxic contaminants into a different state to decontaminate the soil, after creation of the fractured soil formation.

In accordance with still another aspect of the present invention, apparatus for eliminating non-naturally occurring, subsurface, liquid toxic contaminants from soil, includes a) fracturing means for pneumatically fracturing the soil, the fracturing means including i) tubular probe means for receiving a pressurized gas, the probe means including a soil penetrating portion adapted to be inserted in a well in the soil and an above soil portion in fluid communication with the soil penetrating portion, the soil penetrating portion including tube means for receiving the pressurized gas, first and second packer means connected with the tube means for pressing against walls of the well so as to provide a sealed area in the well between the first and second packer means, and nozzle means positioned in the sealed area in fluid communication with the tube means for supplying the pressurized gas into the soil, the nozzle means including at least one orifice therein which fluidly connects the soil with the tubular probe means; and pressurized gas supply means for supplying the pressurized gas to the above soil portion of the tubular probe means, wherein the pressurized gas travels through the at least one orifice into the soil to produce a fractured soil formation; and b) means for transforming the liquid toxic contaminants into a different state to decontaminate the soil, after creation of the fractured soil formation.

In accordance with yet another aspect of the present invention, a method for eliminating non-naturally occurring, subsurface, liquid toxic contaminants from soil, includes the steps of a) pneumatically fracturing the soil, including the steps of i) inserting a tubular probe partially into a well in the soil such that at least one orifice of a nozzle fluidly connected with the tubular probe is positioned at a predetermined height; ii) providing a sealed area in the well on opposite sides of the at least one orifice; and iii) supplying a pressurized gas into the tubular probe such that the pressurized gas travels through the at least one orifice into the soil to produce a fractured soil formation; and b) transforming the liquid toxic contaminants into a different state to decontaminate the soil, after creation of the fractured soil formation.

In accordance with a further aspect of the present invention, apparatus for eliminating non-naturally occurring, subsurface, liquid toxic contaminants from soil, includes a) fracturing means for pneumatically fracturing the soil, the fracturing means including i) tubular probe means for receiving a pressurized gas, the probe means including a soil penetrating portion adapted to be inserted in a well in the soil and an above soil portion in fluid communication with the soil penetrating portion, the soil penetrating portion including tube means for receiving the pressurized gas, first and second packer means connected with the tube means for pressing against walls of the well so as to provide a sealed area in the well between the first and second packer means, nozzle means positioned in the sealed area in fluid communication with the tube means for supplying the pressurized gas into the soil, the nozzle means including at least one orifice therein which fluidly connects the soil with the tubular probe means, and adjustment means for permitting relative movement between the first and second packer means in response to soil movement during a soil fracturing operation; and ii) pressurized gas supply means for supplying the pressurized gas to the above soil portion of the tubular probe means, wherein the pressurized gas travels through the at least one orifice into the soil to produce a fractured soil formation; and b) means for transforming the liquid toxic contaminants into a different state to decontaminate the soil, after creation of the fractured soil formation.

In accordance with a still further aspect of the present invention, a method for eliminating non-naturally occurring, subsurface, liquid toxic contaminants from soil, includes the steps of a) pneumatically fracturing the soil, including the steps of i) inserting a tubular probe partially into a well in the soil such that at least one orifice of a nozzle fluidly connected with the tubular probe is positioned at a predetermined height; ii) providing a sealed area in the well on opposite sides of the at least one orifice; iii) supplying a pressurized gas into the tubular probe such that the pressurized gas travels through the at least one orifice into the soil to produce a fractured soil formation; and iv) permitting relative movement between the first and second packer means in response to soil movement during a soil fracturing operation; and b) transforming the liquid toxic contaminants into a different state to decontaminate the soil, after creation of the fractured soil formation.

The above and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
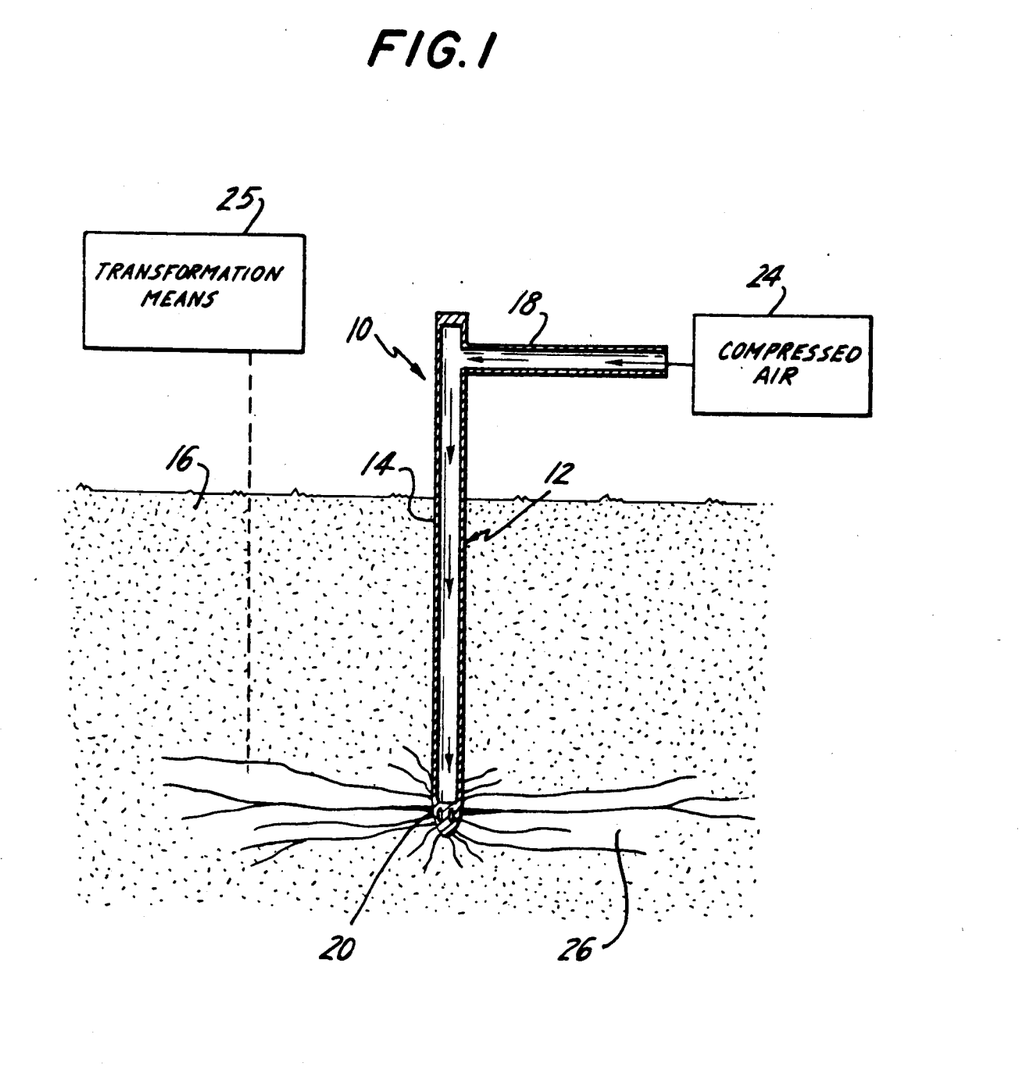
FIG. 1 is a cross-sectional view of apparatus for eliminating non-naturally occurring, subsurface, liquid toxic contaminants according to one embodiment of the present invention.
Figure 2:
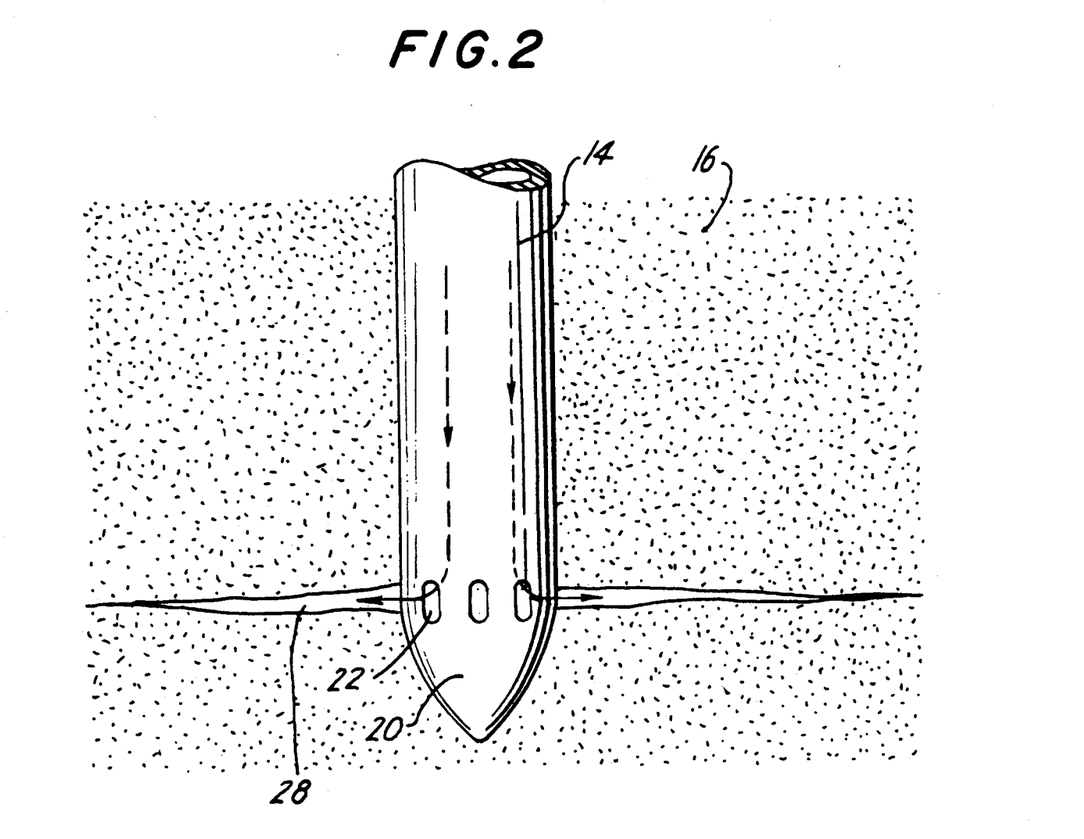
FIG. 2 is an enlarged elevational view of the tip of the apparatus of FIG. 1.
Figure 3:
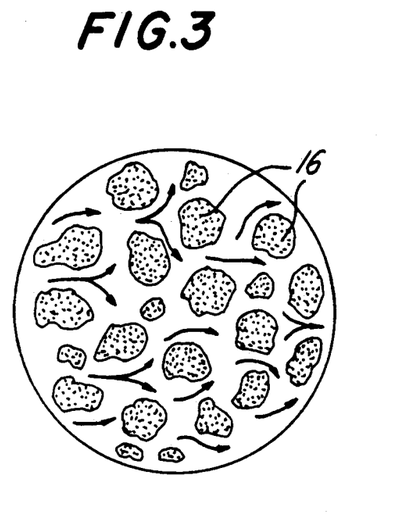
FIG. 3 is an enlarged elevational view of unfractured soil, showing vapor movement in the soil microstructure.

Referring to the drawings in detail, and initially to FIGS. 1 and 2 thereof, apparatus 10 according to a first embodiment of the present invention includes a tubular probe 12 having a soil penetrating portion 14 adapted to be inserted in contaminated soil 16 and an above soil portion 18 in fluid communication with soil penetrating portion 14. The free end of above soil portion 18 is connected with a source 24 of compressed air or other suitable gas.

A nozzle portion 20 is provided at the lower end of soil penetrating portion 14 and in fluid communication therewith. As shown, nozzle portion 20 is preferably tapered so as to provide penetration of tubular probe 12 into soil 16. Nozzle portion 20 includes a plurality of circumferentially arranged orifices 22.

Accordingly, high pressure air is injected into soil 16 to fracture the contaminated soil formation in order to accelerate the removal or treatment of hazardous liquids and vapors. As discussed above, the various methods for detoxification of soil 16 generally involve a method in which liquid toxic contaminants are vaporized, for example, in the processes of vapor extraction and thermal treatment, or in which the liquid toxic contaminants are transformed into a liquid non-toxic component by biodegradation. In other words, in all of the above treatments, liquid toxic contaminants are transformed into a different state to decontaminant the soil. Such transformation means 25 is shown generally in FIG. 1.

In accordance with the present invention, by creating fissures and cracks in contaminated soil 16, a fractured soil formation 26 is formed so as to enhance the aforementioned remedial methods.

Figure 4:
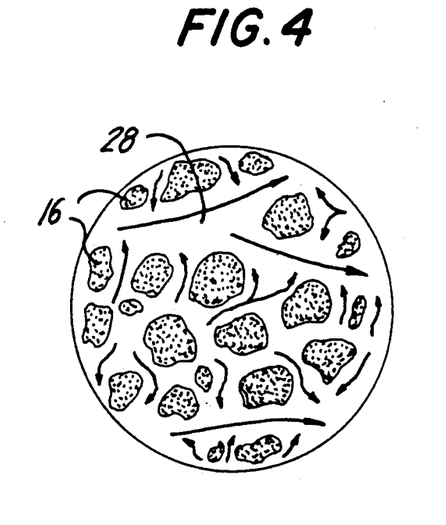
FIG. 4 is an enlarged elevational view of pneumatically fractured soil according to the present invention, showing vapor movement in the soil microstructure.

The principal effect that pneumatic fracturing has on the structure of soil 16 is that it establishes conductive channels 26, as shown in FIG. 4, which permit more rapid movement of liquid and vapor through the soil matrix. This is beneficial since essentially any treatment technology is limited by the permeability of the soil formation being treated. Thus, pneumatic fracturing according to the present invention reduces the treatment time and makes it feasible to treat tightly packed or extremely fine grained soils for which existing technologies are presently ineffective.

The primary transport mechanism for contaminant removal in pneumatically fractured soils will be vapor diffusion and flux out of the soil pores and into the secondary fractures and channels 28. The sudden air surge during the pneumatic fracturing procedure will also impart energy to the soil to break the surface tension of the contaminants adhering to the soil particles.

Pneumatic fracturing will also enhance biodegradation since it will modify the three important factors which affect the growth of subsurface microbial populations, namely oxygen concentration, permeability and water content. An additional benefit of the process for biodegradation is that it will increase the effectiveness of air spargers commonly used in such systems.

Thus, pneumatic fracturing can be employed in landfills to overcome difficulties during treatment. In general, landfills can be characterized as an anisotropic non-homogeneous vadose zone with a highly variable permeability. Typically, permeability ranges from $10^{-2}$ cm/sec for municipal landfills to $10^{-8}$ a cm/sec for ash landfills. The process can be used to induce flow channels in low permeability zones, or establish a pressure gradient for gas collection in high permeability zones.

Of course, tubular probe 12 preferably will be advanced at intervals to provide the desired degree of fracturing and/or aeration, and then reinserted at various locations. Accordingly, with a fractured soil formation 26 being produced, vaporization (and thereby removal) and/or biotransformation of the toxic liquid contaminants in the soil will be advanced with known processes.

Various tests have been performed to confirm the advanced treatment with pneumatic fracturing according to the present invention. These tests have shown that pneumatic fracturing consistently increases the rate of contaminant removal from soils compared with standard removal techniques.

Figure 5:
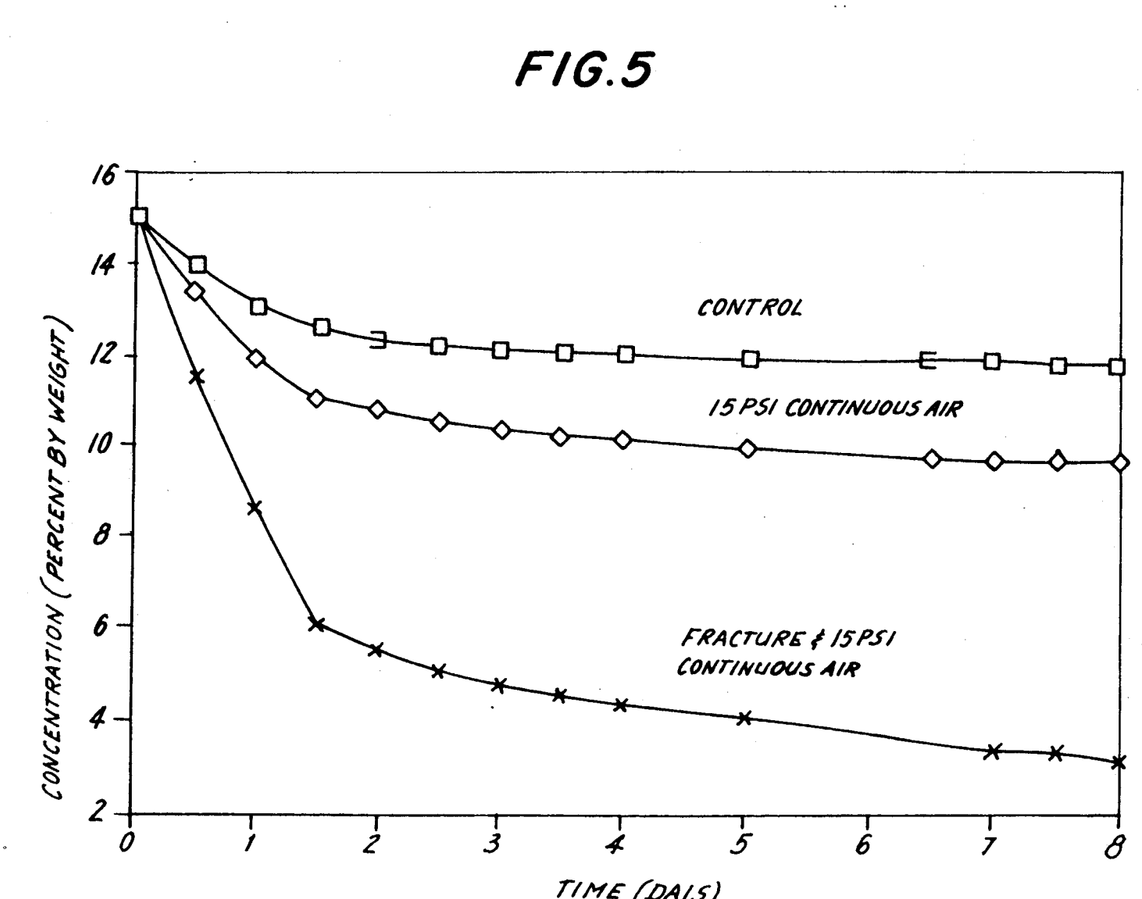
FIG. 5 is a graphical diagram of VOC concentration over time for the present invention and the prior art.

The results of one such test are shown in FIG. 5 in which the contaminant concentration decreased from an initial concentration of approximately 15% by weight to approximately 12% by weight with no removal operation, to approximately 9.5% by weight with continuous air removal (vapor extraction) at a pressure of 15 psi, and to approximately 3% by weight with the 15 psi continuous air being utilized after pneumatic fracture according to the present invention and over the same time periods. The soil samples that were used in these experiments were silty clay with some sand and silty sand. A solution of water and alcohol was used as the surrogate contaminant, and concentration losses were measured as a function of time using a total mass balance method.

Figure 6:
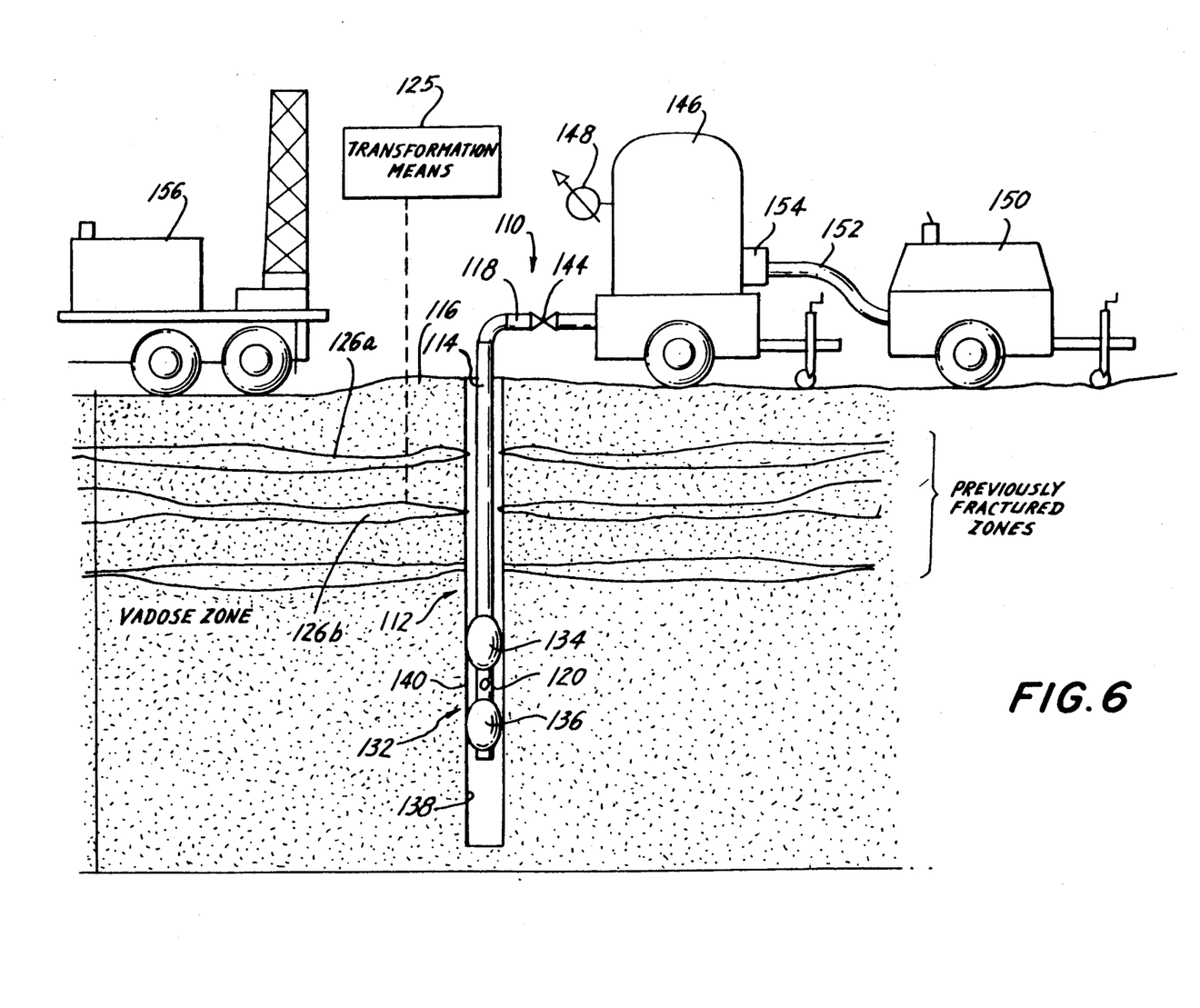
FIG. 6 is an elevational view of apparatus for eliminating non-naturally occurring, subsurface, liquid toxic contaminants according to another embodiment of the present invention.

Referring now to FIG. 6, apparatus 110 according to another embodiment of the present invention for eliminating non-naturally occurring, subsurface, liquid toxic contaminants from contaminated soil 116 will now be described in which elements corresponding to apparatus 10 are identified by the same reference numerals augmented by 100, and a detailed description of the common elements will be omitted herein for the sake of brevity.

Figure 7:
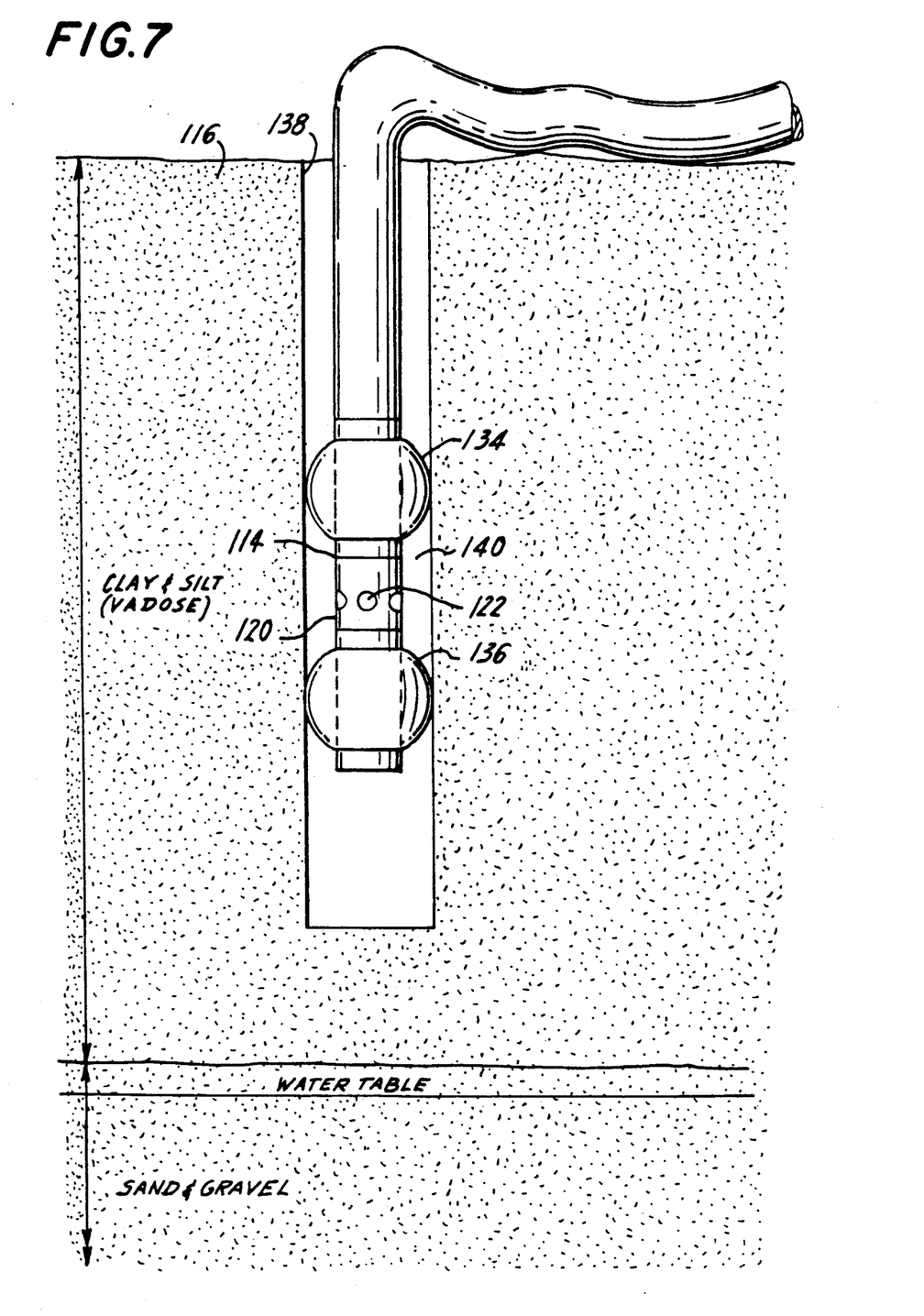
FIG. 7 is an enlarged elevational view of a portion of the apparatus of FIG. 6.

Specifically, apparatus 110 includes a tubular probe 112 having a soil penetrating portion 114 in fluid communication with an above soil portion 118. A double packer assembly 132 is connected to the lower end of soil penetrating portion 114 and includes an upper, elastic balloon-type packer 134 connected in surrounding relation to soil penetrating portion 114 and a lower, elastic balloon-type packer 136 connected in surrounding relation to soil penetrating portion 114 and in spaced relation to upper packer 134. Accordingly, when soil penetrating portion 114 is placed within a larger diameter well 138, packers 134 and 136 tightly engage the walls of well 138 so as to create a sealed area 140 between packers 134 and 136 in well 138. A drill rig 156 is also shown for drilling each well 138.

Nozzle portion 120 is formed as part of soil penetrating portion 114, between packers 134 and 136 in space 140, and includes a plurality of circumferentially spaced orifices 122. The number of orifices 122 can vary. For example, the number of orifices can be two (FIG. 9), four (FIG. 10) or eight (FIG. 11).

Figure 8:
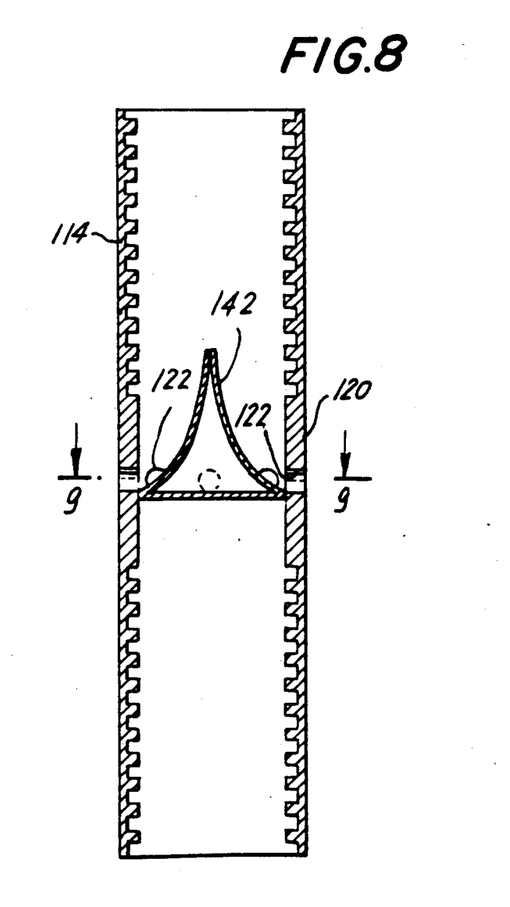
FIG. 8 is an enlarged longitudinal cross-sectional view of the nozzle of the apparatus of FIG. 6.
Figure 8A:
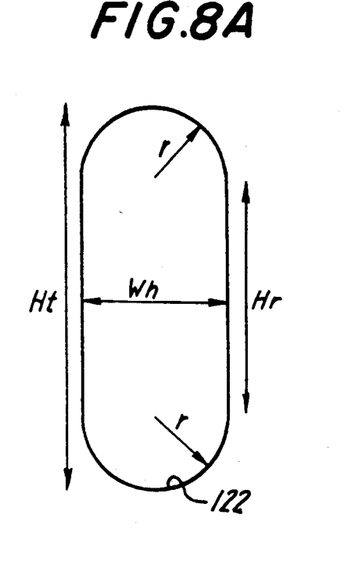
FIG. 8A is a schematic plan view showing the shape of a nozzle orifice.
Figure 9:
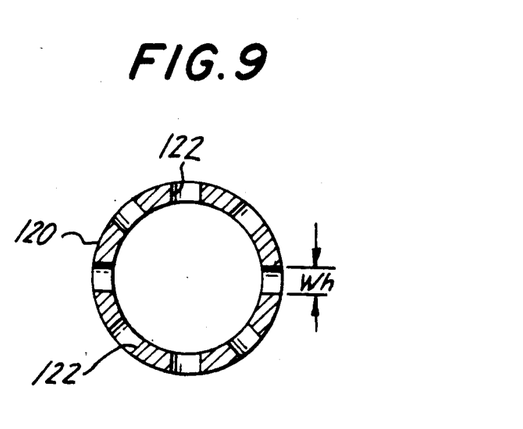
FIG. 9 is a cross-sectional view of the nozzle of FIG. 8, taken along line 9—9 thereof.
Figure 10:
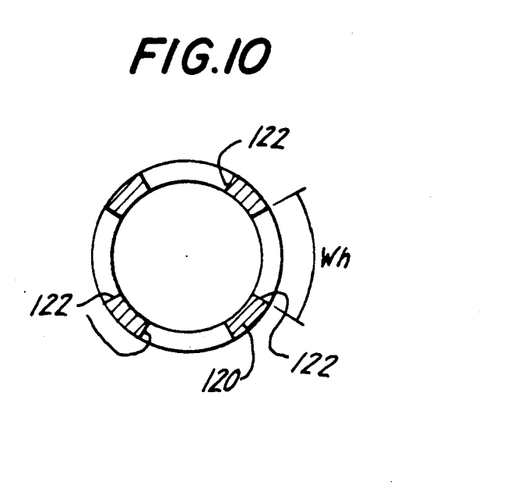
FIG. 10 is a cross-sectional view similar to FIG. 9, of a nozzle according to another embodiment of the present invention.
Figure 11:
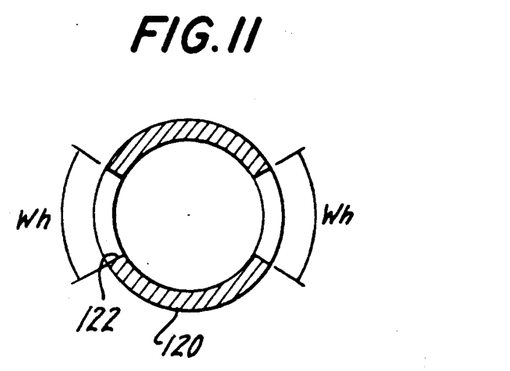
FIG. 11 is a cross-sectional view similar to FIG. 9, of a nozzle according to still another embodiment of the present invention.

It is noted that orifices 122 preferably have oval-type configurations, as shown in FIG. 8A, in which the dimensions of widths Wh are 0.20, 0.40 and 0.75 inch height, heights Ht are 0.55, 0.60 and 0.75 inch, heights Hr are 0.35, 0.20 and 0.10 inch, and radii r are 0.10, 0.20 and 0.375 inch, respectively, for the embodiments of FIGS. 9–11, each for an inner diameter of one inch for soil penetrating portion 114. Other configurations for orifices 122 can be provided, such as a circular configuration or the like.

A nozzle cone 142 is positioned in nozzle portion 120 with its larger base connected in sealing relation to the walls of nozzle portion 120 immediately below orifices 122. Accordingly, the sloped walls of nozzle cone 142 direct the pressurized air out through orifices 122.

Above soil portion 118 is connected through a quick release valve 144 to a holding or receiving tank 146 having a pressure gauge 148 mounted thereto in order to measure the pressure within holding tank 146. Holding tank 146, in turn, is connected with a compressor 150 through a high pressure hose 152 and air purification unit 154.

In operation, after drill rig 156 drills a well 138, soil penetrating portion 114 with double packer assembly 132 is inserted down the well to a first height. Compressor 150 then supplies pressurized air through high pressure hose 152 and air purification unit 154 to holding tank 146 to provide a large supply of pressurized air within holding tank 146. When the pressure within holding tank 146 reaches a predetermined pressure as determined by pressure gauge 148, quick release valve 144 is opened to provide a sudden rush of pressurized air down soil penetrating portion 114 of tubular probe 112. Because of the arrangement of nozzle cone 142, the air is pushed outwardly through orifices 122 with substantially no loss of pressure. In other words, nozzle cone 142 ensures that there is substantially the same pressure reading as with an open ended pipe. Accordingly, the sudden rush of pressurized air produces a first fractured soil formation 126a. Thereafter, double packer assembly 132 and soil penetrating portion 114 are inserted to a further depth and the operation is repeated to provide a second fractured soil formation 126b, and so on. Thereafter, the above transformation processes such as vapor extraction, biodegradation, soil washing and thermal treatment can be performed.

Figure 12:
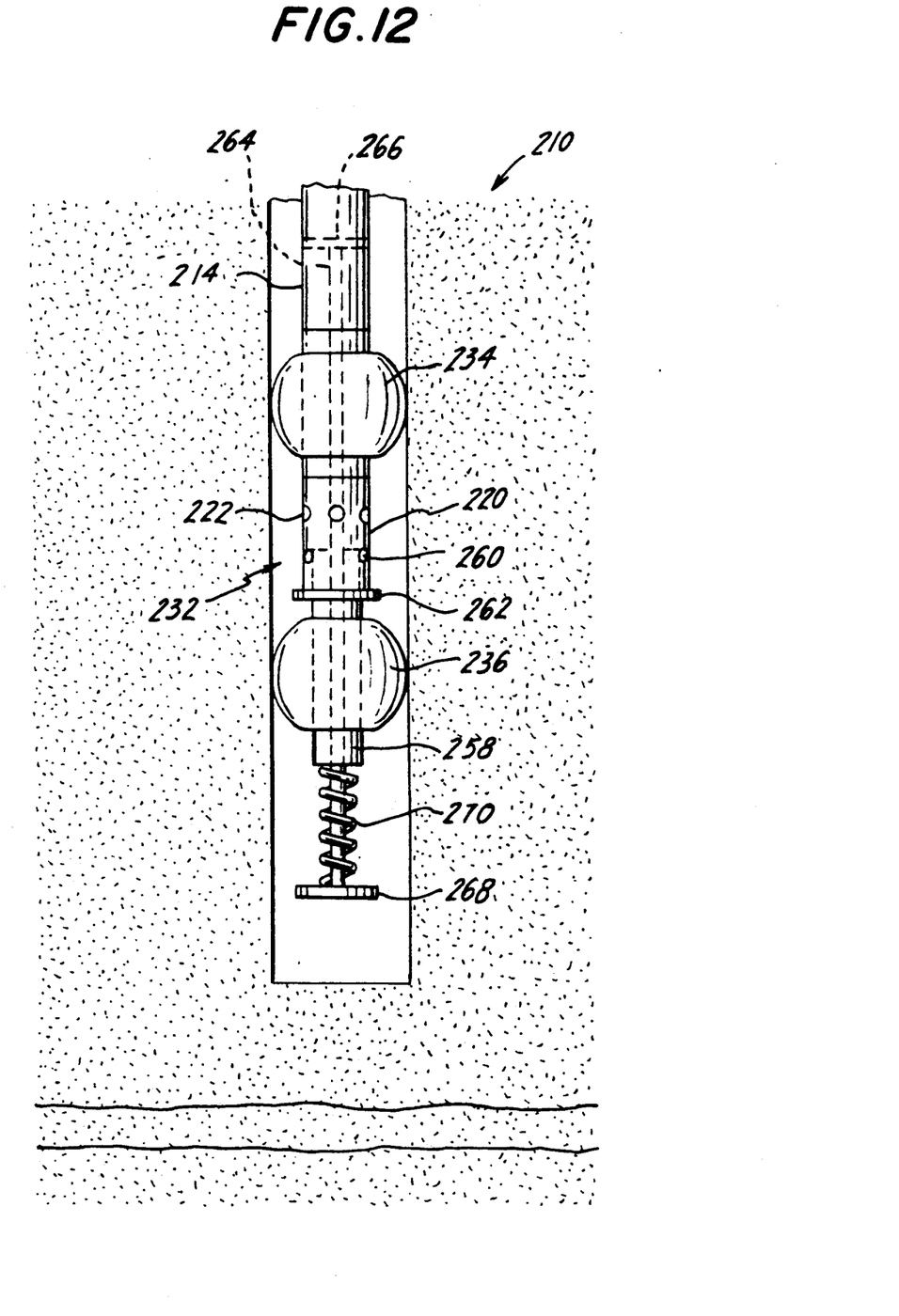
FIG. 12 is an elevational view, partly in phantom, of apparatus for eliminating non-naturally occurring, subsurface, liquid toxic contaminants according to another embodiment of the present invention.

Referring now to FIG. 12, apparatus 210 for eliminating non-naturally occurring, subsurface, liquid toxic contaminants from soil, will now be described in which elements corresponding to apparatus 110 are identified by the same reference numerals with a 200 prefix, and a detailed description of the common elements will be omitted herein for the sake of brevity.

Specifically, in many instances, after the soil formation has been fractured, the soil will move. With the embodiment of FIGS. 6–11, however, packers 134 and 136 are fixed relative to each other. As a result, undue stress on packer assembly 132 may result.

With apparatus 210, packer 236 is movable in the axial direction with respect to packer 234. Specifically, packer 236 is mounted to a smaller diameter tube 258 which is slidable within nozzle portion 220. An O-ring seal 260 or the like is provided therebetween to ensure a sealed arrangement. An annular flange 262 is provided in surrounding relation to smaller diameter tube 258 near the upper end and normally abuts against the lower end of nozzle portion 220 to provide an additional seal prior to performing the fracturing operation.

A rod 264 extends through smaller diameter tube 258, nozzle portion 220 and soil penetrating portion 214 and is fixed within soil penetrating portion 214 by a spider assembly 266 or the like. The opposite end of rod 264 extending from smaller diameter tube 258 has a circular stop 268 secured thereto, and a helical coil spring 270 extends about rod 264 and is restrained between stop 268 and the lower end of smaller diameter tube 258, so as to normally bias smaller diameter tube 258, and thereby second packer 236, toward first packer 234, to the position shown in FIG. 12.

Upon fracturing of the soil by the sudden burst of air, the earth will separate, and accordingly, second packer 236 will move with the earth apart from first packer 234 to maintain the sealed arrangement and to prevent damage to double packer assembly 232.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. Apparatus for eliminating non-naturally occurring, subsurface, liquid toxic contaminants from soil, comprising:

a) fracturing means for pneumatically fracturing the soil, said fracturing means including:
  i) tubular probe means for receiving a pressurized gas, said probe means including a soil penetrating portion adapted to be inserted in the soil and an above soil portion in fluid communication with said soil penetrating portion;
  ii) nozzle means in fluid communication with said soil penetrating portion of said tubular probe means for supplying said pressurized gas from said tubular probe means into the soil, said nozzle means including at least one orifice therein which fluidly connects the soil with said tubular probe means; and
  iii) pressurized gas supply means for supplying a pressurized gas to said above soil portion of said tubular probe means, wherein the pressurized gas travels through the at least one orifice into the soil to produce a fractured soil formation; and
 b) means for transforming said liquid toxic contaminants into a different state to decontaminate said soil, after creation of said fractured soil formation.

2. Apparatus according to claim 1, wherein said means for transforming includes means for vaporizing said liquid toxic contaminants and removing said vaporized contaminants.

3. Apparatus according to claim 1, wherein said means for transforming includes microbial means for transforming said liquid toxic contaminants to non-toxic contaminants.

4. Apparatus according to claim 1, wherein said nozzle means is formed as a tapered end of said tubular probe means.

5. Apparatus according to claim 4, wherein said nozzle means includes a plurality of orifices arranged circumferentially therearound.

6. A method for eliminating non-naturally occurring, subsurface, liquid toxic contaminants from soil, comprising the steps of:

a) pneumatically fracturing the soil, including the steps of:
  i) inserting a tubular probe partially into the soil such that at least one orifice of a nozzle fluidly connected with said tubular probe is positioned at a predetermined height; and
  ii) supplying a pressurized gas into said tubular probe such that the pressurized gas travels through the at least one orifice into the soil to produce a fractured soil formation; and
 b) transforming said liquid toxic contaminants into a different state to decontaminate said soil, after creation of said fractured soil formation.

7. A method according to claim 6, wherein said step of transforming includes the step of vaporizing said liquid toxic contaminants and removing said vaporized contaminants.

8. A method according to claim 6, wherein said step of transforming includes the step of transforming said liquid toxic contaminants into non-toxic contaminants.

9. Apparatus for eliminating non-naturally occurring, subsurface, liquid toxic contaminants from soil, comprising:

a) fracturing means for pneumatically fracturing the soil, said fracturing means including:
  i) tubular probe means for receiving a pressurized gas, said probe means including a soil penetrating portion adapted to be inserted in a well in the soil and an above soil portion in fluid communication with said soil penetrating portion, said soil penetrating portion including:

A) tube means for receiving the pressurized gas,

B) first and second packer means connected with said tube means for pressing against walls of said well so as to provide a sealed area in said well between said first and second packer means, and C) nozzle means positioned in said sealed area in fluid communication with said tube means for supplying said pressurized gas into the soil, said nozzle means including at least one orifice therein which fluidly connects the soil with said tubular probe means; and ii) pressurized gas supply means for supplying the pressurized gas to said above soil portion of said tubular probe means, wherein the pressurized gas travels through the at least one orifice into the soil to produce a fractured soil formation; and b) means for transforming said liquid toxic contaminants into a different state to decontaminate said soil, after creation of said fractured soil formation.

10. Apparatus according to claim 9, wherein said means for transforming includes means for vaporizing said liquid toxic contaminants and removing said vaporized contaminants.

11. Apparatus according to claim 9, wherein said means for transforming includes microbial means for transforming said liquid toxic contaminants to non-toxic contaminants.

12. Apparatus according to claim 9, further including cone means positioned in said nozzle means for directing said pressurized gas through said at least one orifice with substantially no pressure drop.

13. Apparatus according to claim 9, wherein said nozzle means includes a plurality of orifices arranged circumferentially therearound.

14. Apparatus according to claim 9, wherein each said orifice includes a substantially oval configuration.

15. Apparatus according to claim 9, wherein said pressurized gas supply means includes compressor means for producing said pressurized gas, holding tank means for holding a supply of said pressurized gas and valve means for connecting said holding means with said tubular probe means in order to provide a rush of said pressurized gas to said tubular probe means.

16. A method for eliminating non-naturally occurring, subsurface, liquid toxic contaminants from soil, comprising the steps of:

a) pneumatically fracturing the soil, including the steps of:

i) inserting a tubular probe partially into a well in the soil such that at least one orifice of a nozzle fluidly connected with said tubular probe is positioned at a predetermined height;

ii) providing a sealed area in the well on opposite sides of said at least one orifice; and iii) supplying a pressurized gas into said tubular probe such that the pressurized gas travels through the at least one orifice into the soil to produce a fractured soil formation; and b) transforming said liquid toxic contaminants into a different state to decontaminate said soil, after creation of said fractured soil formation.

17. A method according to claim 16, wherein said step of transforming includes the step of vaporizing said liquid toxic contaminants and removing said vaporized contaminants.

18. A method according to claim 16, wherein said step of transforming includes the step of transforming said liquid toxic contaminants into non-toxic contaminants.

19. A method according to claim 16, further including the step of directing said pressurized air through said at least one orifice with substantially no pressure drop.

20. A method according to claim 16, wherein said step of supplying pressurized gas includes the step of producing said pressurized gas, storing a large quantity of said produced pressurized gas and valving said large quantity of pressurized gas to said tubular probe at a predetermined time.

21. Apparatus for eliminating non-naturally occurring, subsurface, liquid toxic contaminants from soil, comprising:

a) fracturing means for pneumatically fracturing the soil, said fracturing means including:

i) tubular probe means for receiving a pressurized gas, said probe means including a soil penetrating portion adapted to be inserted in a well in the soil and an above soil portion in fluid communication with said soil penetrating portion, said soil penetrating portion including:

A) tube means for receiving the pressurized gas,

B) first and second packer means connected with said tube means for pressing against walls of said well so as to provide a sealed area in said well between said first and second packer means, C) nozzle means positioned in said sealed area in fluid communication with said tube means for supplying said pressurized gas into the soil, said nozzle means including at least one orifice therein which fluidly connects the soil with said tubular probe means, and D) adjustment means for permitting relative movement between said first and second packer means in response to soil movement during a soil fracturing operation; and ii) pressurized gas supply means for supplying the pressurized gas to said above soil portion of said tubular probe means, wherein the pressurized gas travels through the at least one orifice into the soil to produce a fractured soil formation; and b) means for transforming said liquid toxic contaminants into a different state to decontaminate said soil, after creation of said fractured soil formation.

22. Apparatus according to claim 21, wherein said means for transforming includes means for vaporizing said liquid toxic contaminants and removing said vaporized contaminants.

23. Apparatus according to claim 21, wherein said means for transforming includes microbial means for transforming said liquid toxic contaminants to non-toxic contaminants.

24. Apparatus according to claim 21, further including cone means positioned in said nozzle means for directing said pressurized gas through said at least one orifice with substantially no pressure drop.

25. Apparatus according to claim 21, wherein said nozzle means includes a plurality of orifices arranged circumferentially therearound.

26. Apparatus according to claim 21, wherein each said orifice includes a substantially oval configuration.

27. Apparatus according to claim 21, wherein said pressurized gas supply means includes compressor means for producing said pressurized gas, holding tank means for holding a supply of said pressurized gas and valve means for connecting said holding means with said tubular probe means in order to provide a rush of said pressurized gas to said tubular probe means.

28. Apparatus according to claim 21, wherein said adjustment means includes means for slidably connecting said first and second packer means.

29. Apparatus according to claim 28, wherein said means for slidably connecting includes a different diameter tube on which said second packer means is mounted, said different diameter tube being slidable with respect to said tube means, sealing means for sealing said tube means with said different diameter tube, a rod connected to said tube means and extending through said tube means and out of said different diameter tube, and spring means engaged between said rod and said different diameter tube for biasing said second packer means toward said first packer means while permitting relative movement therebetween.

30. A method for eliminating non-naturally occurring, subsurface, liquid toxic contaminants from soil, comprising the steps of:
a) pneumatically fracturing the soil, including the steps of:
i) inserting a tubular probe partially into a well in the soil such that at least one orifice of a nozzle fluidly connected with said tubular probe is positioned at a predetermined height;
ii) providing a sealed area in the well on opposite sides of said at least one orifice;
iii) supplying a pressurized gas into said tubular probe such that the pressurized gas travels through the at least one orifice into the soil to produce a fractured soil formation; and
iv) permitting relative movement between said first and second packer means in response to soil movement during a soil fracturing operation; and
b) transforming said liquid toxic contaminants into a different state to decontaminate said soil, after creation of said fractured soil formation.

31. A method according to claim 30, wherein said step of transforming includes the step of vaporizing said liquid toxic contaminants and removing said vaporized contaminants.

32. A method according to claim 30, wherein said step of transforming includes the step of transforming said liquid toxic contaminants into non-toxic contaminants.

33. A method according to claim 30, further including the step of directing said pressurized air through said at least one orifice with substantially no pressure drop.

34. A method according to claim 30, wherein said step of supplying pressurized gas includes the step of producing said pressurized gas, storing a large quantity of said produced pressurized gas and valving said large quantity of pressurized gas to said tubular probe at a predetermined time.

* * * * *